US005522059A

United States Patent [19]

Marushima et al.

[11] Patent Number: 5,522,059
[45] Date of Patent: May 28, 1996

[54] APPARATUS FOR MULTIPORT MEMORY ACCESS CONTROL UNIT WITH PLURALITY OF BANK BUSY STATE CHECK MECHANISMS EMPLOYING ADDRESS DECODING AND COINCIDENCE DETECTION SCHEMES

[75] Inventors: Toshikazu Marushima; Kohji Kinoshita, both of Tokyo, Japan

[73] Assignee: NEC Corporation, Tokyo, Japan

[21] Appl. No.: 156,899

[22] Filed: Nov. 24, 1993

[30] Foreign Application Priority Data

Nov. 26, 1992 [JP] Japan ..................... 4-339834

[51] Int. Cl.⁶ .................................. G06F 12/02
[52] U.S. Cl. .................. 395/476; 395/477; 395/405; 364/DIG. 1; 364/DIG. 2; 364/241.9; 364/228.1
[58] Field of Search ............................. 395/400, 425, 395/401, 405, 427, 476, 410, 458, 479, 477; 364/200 MS File, 900 MS File

[56] References Cited

U.S. PATENT DOCUMENTS

| | | | |
|---|---|---|---|
| 3,845,425 | 10/1974 | Clements et al. | 395/479 |
| 4,435,765 | 3/1984 | Uchida et al. | 395/550 |
| 4,633,434 | 12/1986 | Scheuneman | 395/550 |
| 4,652,993 | 3/1987 | Scheuneman et al. | 395/478 |
| 4,654,788 | 3/1987 | Boudreau et al. | 395/287 |
| 4,755,938 | 7/1988 | Takahashi et al. | 395/729 |
| 4,918,600 | 4/1990 | Harper, III et al. | 395/484 |
| 5,036,456 | 7/1991 | Koegel | 395/837 |
| 5,060,145 | 10/1991 | Scheuneman et al. | 395/496 |
| 5,073,871 | 12/1991 | Uchida et al. | 395/478 |
| 5,276,838 | 1/1994 | Rao et al. | 395/444 |
| 5,323,489 | 6/1994 | Bird | 395/494 |
| 5,363,484 | 11/1994 | Desnoyers et al. | 395/200.07 |
| 5,367,654 | 11/1994 | Furukawa et al. | 395/485 |
| 5,392,443 | 2/1995 | Sakakibara et al. | 395/800 |

*Primary Examiner*—Matthew M. Kim
*Attorney, Agent, or Firm*—Foley & Lardner

[57] ABSTRACT

A memory access control unit in a data processing apparatus. The memory access control unit includes memory unit has a plurality of memory ports. Each of the memory ports connects to plurality of memory banks. The memory access control unit has a circuit for allocating in advance the memory addresses to be accessed among the corresponding memory ports. By utilizing this circuit, a group of memory bank addresses in a busy state are registered for each memory port of the memory unit, and this group of memory bank addresses in a busy state are compared with the memory addresses to be accessed. As a result of this comparison, it is judged whether or not the memory banks to be accessed are in a busy state.

2 Claims, 9 Drawing Sheets

APPARATUS FOR MULTIPORT MEMORY ACCESS CONTROL UNIT WITH PLURALITY OF BANK BUSY STATE CHECK MECHANISMS EMPLOYING ADDRESS DECODING AND COINCIDENCE DETECTION SCHEMES

BACKGROUND OF THE INVENTION

1. Field of the Invention

The present invention relates to a data processing apparatus, and more particularly to a memory access control unit for controlling access to a memory unit consisting of a plurality of memory banks.

In a memory unit consisting of a plurality of memory banks, any individual memory bank is in a busy state as long as it is being accessed. Once a memory bank enters into a busy state, it can permit no other access until it is released from that busy state. The memory access control unit according to the present invention is intended to manage the busy state of each memory and to judge whether or not any subsequent access to the memory can be permitted.

2. Description of the Prior Art

Units of this kind according to the prior art for managing the busy state of memory units include, for instance, what is disclosed in the U.S. Pat. No. 4,435,765 granted on Mar. 6, 1984. This prior art unit controls access to a vector register consisting of a plurality of banks in a vector processor. For this control, the unit has a bank slot reserve control section in its access start control circuit to keep track of the busy or unbusy state of each bank. In this bank slot reserve control section according to the prior art, flip-flops (F/F's) of one bit for each bank are provided in one-to-one correspondence. Accordingly, F/F's of as many bits as the banks are required, and this configuration is difficult to realize where the number of banks is greater than a certain limit. When this bank slot reserve control section is to be applied to a memory unit having a plurality of memory ports, the busy state has to be checked over a plurality of memory ports, so that a large amount of complex hardware should be provided.

An object of the present invention is to provide a memory access control unit capable of readily controlling access to a memory unit having a plurality of memory ports, each of which is to be connected to a plurality of banks.

SUMMARY OF THE INVENTION

A memory access control unit which is a preferred embodiment of the invention has a plurality of memory ports, each of which further controls access to a memory unit consisting of a plurality of banks. This memory access control unit is provided, for each of its memory ports, with a group of registers for reserving a group of bank addresses of banks in a busy state. Accordingly, information for registering the busy state of banks is allocated in advance to the memory ports according to the bank addresses in the memory unit to be accessed. Each group of registers for reserving the busy state of banks holds the group of bank addresses assigned to the group of banks which are to be connected to the corresponding memory port. These groups of bank addresses are compared by groups of comparators, one group provided for each memory port, with the bank addresses to be accessed, so that the permissibility of each intended access is judged.

BRIEF DESCRIPTION OF THE DRAWINGS

One aspect of the present invention will become more apparent from the following detailed description when taken in conjunction with the accompanying drawings, wherein.

DETAILED DESCRIPTION OF THE PREFERRED EMBODIMENTS

A first preferred embodiment of the present invention will be described in detail below with reference to drawings.

Figure 1:
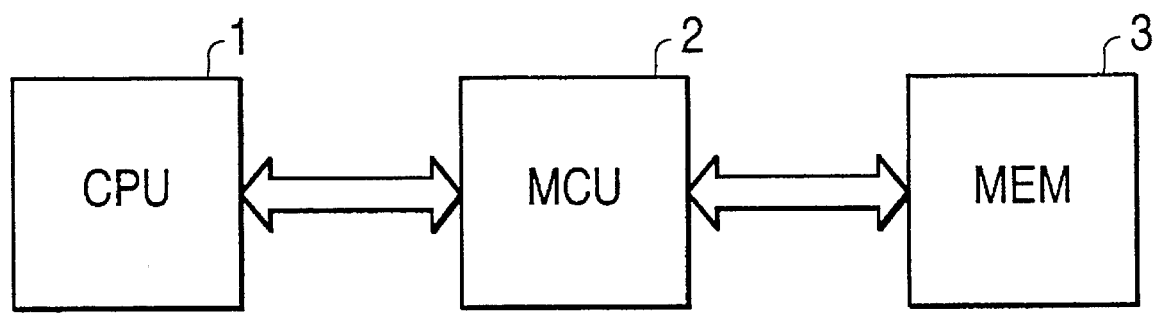
FIG. 1 is a block diagram illustrating a preferred embodiment of the invention.

Referring to FIG. 1, a data processing apparatus according to the invention has a central processing unit (CPU) 1, a memory access control unit (MCU) 2 and a memory unit (MEM) 3. Memory access requests from the CPU 1 are transferred to the MEM 3 via the MCU 2. Data read out of the MEM 3 are entered into the CPU 1 via the MCU 2.

Figure 2:
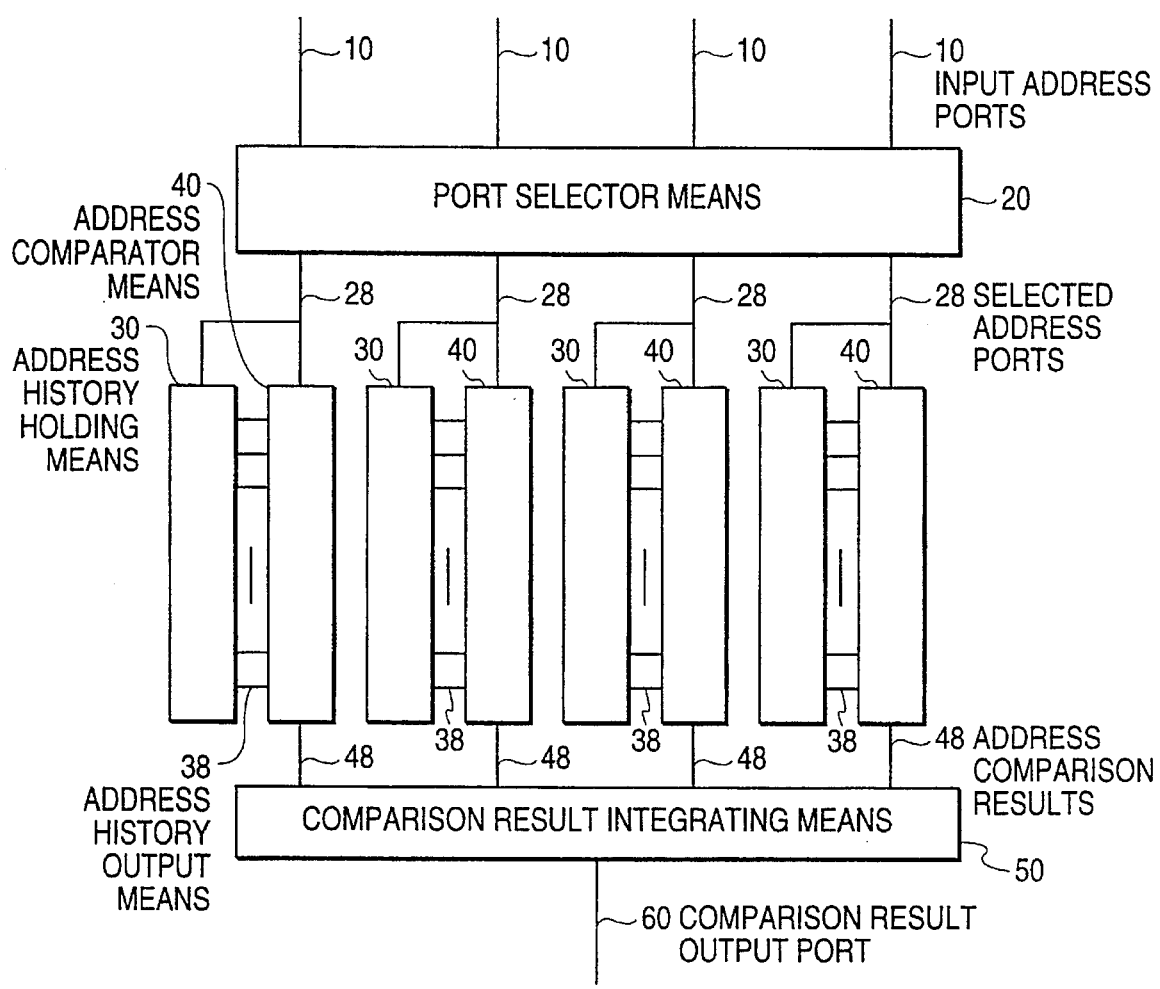
FIG. 2 is a block diagram of the principal part of this preferred embodiment, which is a memory access control unit.

Referring to FIG. 2, the MCU 2 in the first embodiment of the invention has input address ports 10 for requesting access from the CPU 1, port selector means 20 for allocating an input address to one of a plurality of output ports; address history holding means 30 for holding the bank addresses accessed to said port in the past; address comparator means 40 for comparing input addresses to said ports and the contents of the address history holding means 30; comparison result integrating means 50 for integrating the results of each comparison by the address comparator means 40; and a comparison result output port 60.

Figure 3:
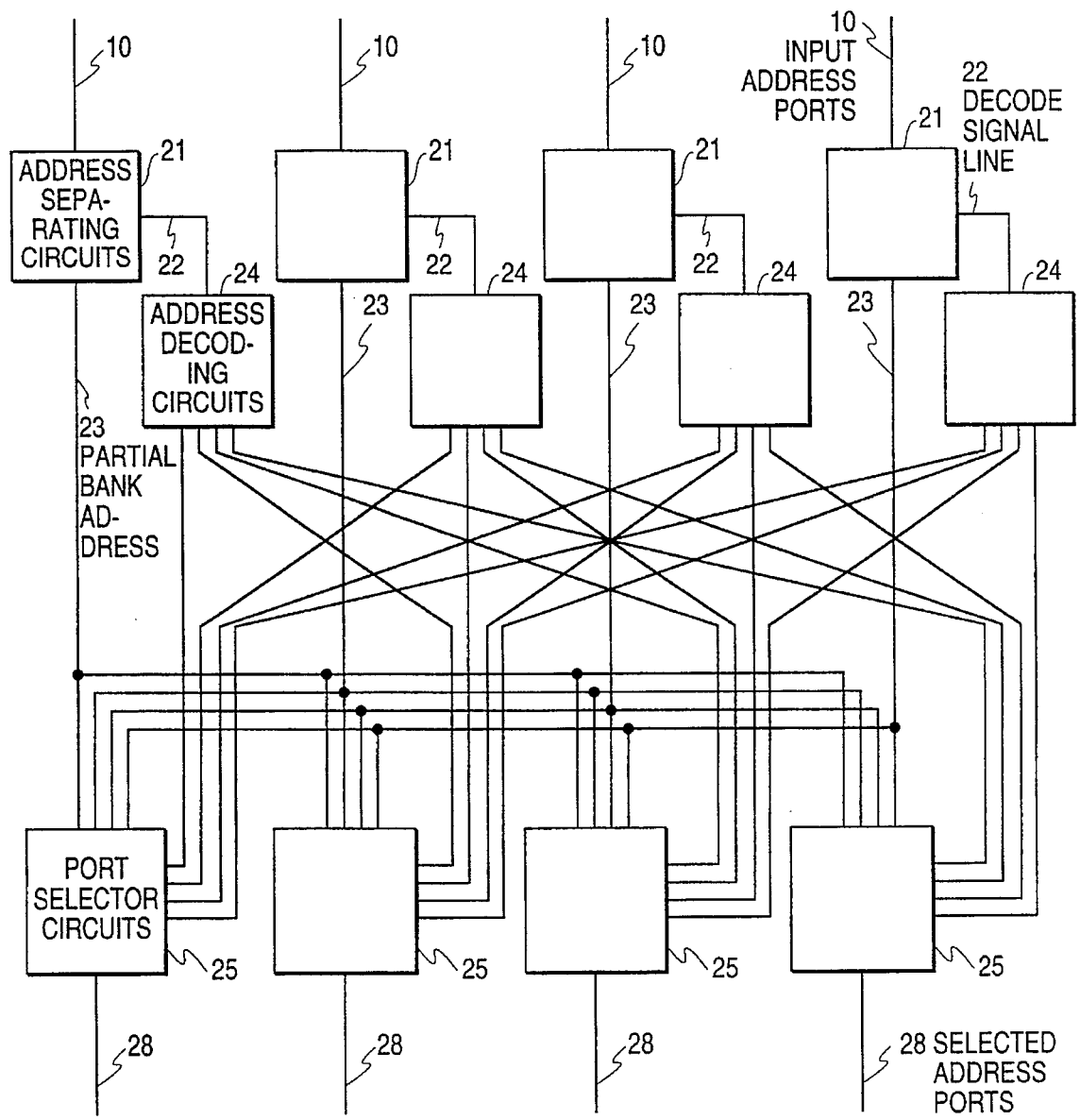
FIG. 3 is a block diagram illustrating a more detailed structure of the port selector means.

Referring to FIG. 3, the port selector means 20 has address separating circuits 21, each for separating a bank address entered into the corresponding input address port 10 into a decode signal for port selection and the remaining address part (hereinafter referred to as the partial bank address), and supplying them to signal lines 22 and 23, respectively; address decoding circuits 24, each for decoding the decode signal for port selection on the corresponding signal line 22; port selector circuits 25, each for selecting, on the basis of a selection signal provided by the corresponding address decoding circuit 24, one partial bank address from the group of partial bank addresses on the corresponding signal line 23; and selected address ports 28, each for supplying the selected partial bank address.

Figure 4:
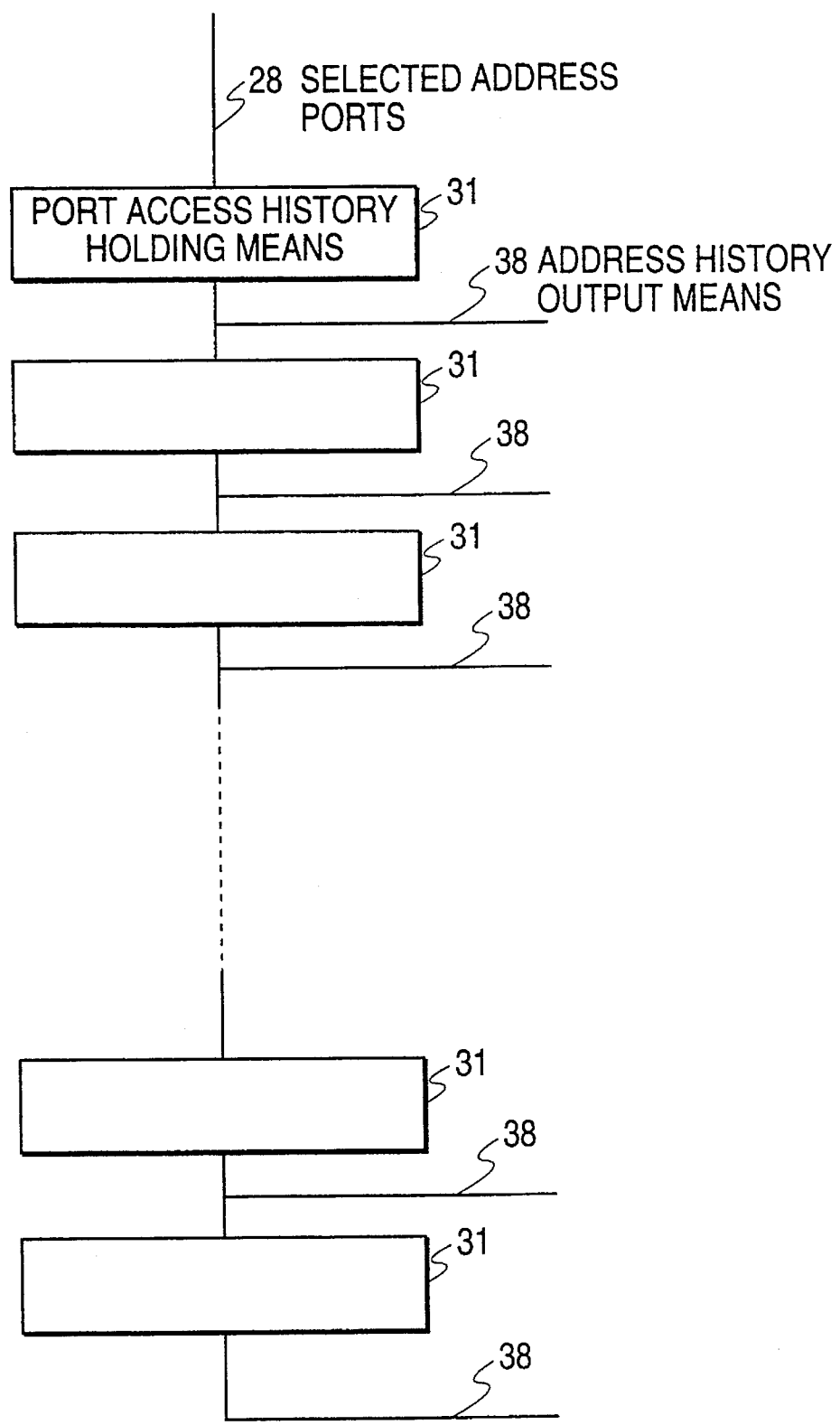
FIG. 4 is a block diagram illustrating a more detailed structure of the address history holding means.

Referring to FIG. 4, the address history holding means 30, in one of its possible configurations, has port access history holding means 31 for holding partial bank addresses as the history of accessing to the pertinent port in the past; and address history output means 38 for supplying the partial bank addresses held in the port access history holding means 31 to the address comparator means 40.

Figure 5:
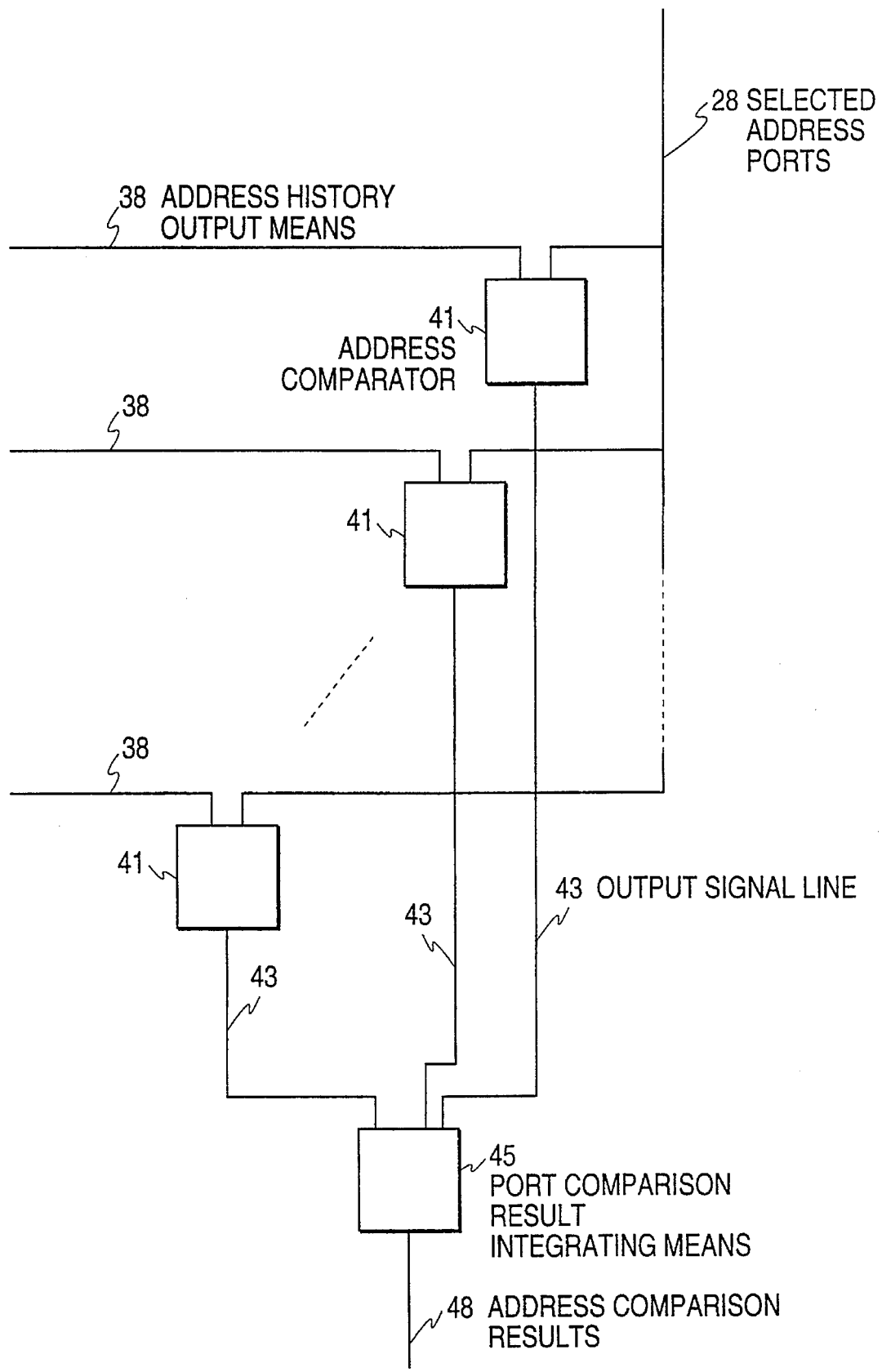
FIG. 5 is a block diagram illustrating a more detailed structure of the address comparator means.

Referring to FIG. 5, the address comparator means 40, in one of its possible configurations, has address comparators 41, each for comparing a partial bank address from the address history output means 38 in the address history holding means 30 and another partial bank address from the port selector means 20, and supplying the result of address comparison to a signal line 43; and port comparison result integrating means 45 for integrating address comparison results 43 from the address comparators 41, and supplying the results of address comparison in each port to a signal line 48.

With reference to the first embodiment of the invention having the above-described configuration, the operation of the invention will be described below.

Referring to FIGS. 1, 2 and 3 together, each of the addresses entered into one of the input address ports 10 from the CPU 1 is separated by the corresponding address separating circuit 21 into a decode signal for port selection and a partial bank address, which are supplied to the corresponding signal lines 22 and 23, respectively. The bit width of this decode signal is log(N), where N is the number of ports within the memory access control unit. The corresponding port selector circuit 25 supplies a selected address port 28 with a partial bank address, out of the partial bank addresses on the plurality of signal lines 23, corresponding to the port selected by the pertinent address decoding circuit 24. However, there should be assurance that the same port selector circuit 25 can never be selected by more than one address decoding circuits 24.

Referring to FIGS. 2 and 5, next, partial bank addresses from the port selector means 20 are compared with the corresponding partial bank addresses of the plurality of address history holding means 30 by the respectively corresponding ones of the plurality of address comparators 41 in the address comparator means 40. These results of address comparison are supplied to the respective output signal lines 43 of the address comparators 41. Detection of address coincidence by any address comparator 41 in a port means that the result of address comparison on the output signal line 43 connected to the address comparator 41 indicates that bank conflict will occur in the access to that port. The port conflict result integrating means 45, into which these results of address comparison, integrated on a port-by-port basis, are entered, supplies address comparison results 48 in each port. The comparison result integrating means 50, which further integrates these in-port address comparison results 48, supplies its result to the comparison result output port 60.

Each partial bank address from the port selector means 20 is first held in the first stage of the plurality of port access history holding means 31 in the address history holding means 30, and is thereafter propagated from one to next of the consecutive port access history holding means 31 at each clock. The number of stages of the port access history holding means 31 required here is dependent on the bank cycle time of memory banks, i.e. the number of clocks for remaining a bank busy state.

As stated above, the port access history holding means 31, in which the history of the busy states of banks are registered, are divided corresponding to each memory port. Therefore, a bank address attempted to be accessed is once allocated to a memory port according to a partial value of the bank address. This enables the port access history holding means 31 to hold the bank addresses with partial omission rather than the bank addresses corresponding to the whole memory unit. For instance, in order to hold bank addresses for a memory unit having 32 banks, five-bit F/F's are needed. It is supposed here that this memory unit has, for instance, four memory ports and can accept a maximum of four requests at the same time. In this situation, if items of bank address information are to be registered without being allocated to memory ports in advance, the port access history holding means will have to hold four five-bit bank addresses corresponding to the four requests. The present invention, by allocating the items of bank address information to the four memory ports in advance, makes three bits sufficient as the bit width of the bank address to be held in each memory port.

Furthermore, if the items of bank address information are to be registered without being allocated to memory ports in advance, the address comparators will have to perform address comparison with every port access history holding means for every one of the four requests. The invention, by allocating the items of bank address information to the four memory ports in advance, makes it sufficient to perform address comparison only with the port access history holding means 31 in the corresponding memory port. This means that the invention, in addition to the aforementioned shortening of bank addresses width to be reserved, can help to save much of the hardware amount of the address comparators.

Next will be described, with reference to FIG. 6, an example of operation of the preferred embodiment of the present invention illustrated in FIG. 2.

Figure 6:
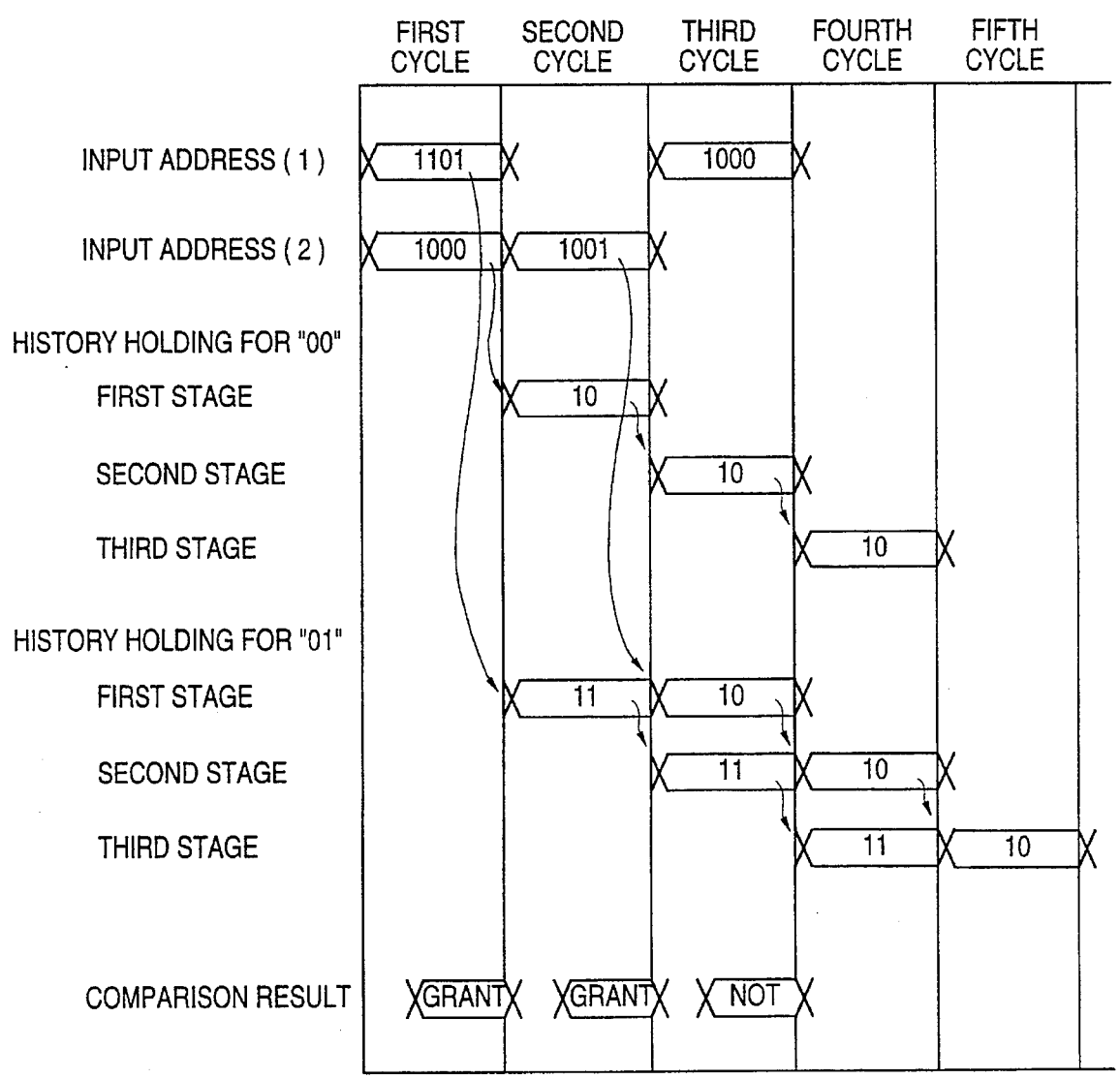
FIG. 6 is a timing chart showing the operational timings of this preferred embodiment.

FIG. 6 is a timing chart illustrating an example of operation of the the memory access control unit shown in FIG. 2. First the memory access control unit, in accordance with the two least significant bits of the address entered into one of the input address ports 10 in the first cycle, supplies the two most significant bits, i.e. a partial bank address, to one of the selected address ports 28 in the port selector means 20. In this example, the whole bank address is expressed in four bits, and there are supposed to be four each of input ports and internal ports for holding address histories. Generally, any desired form convenient for the given system can be selected for this configuration. In the instance of FIG. 6, valid bank addresses are entered into two input address ports 10 in the first cycle. As the input address (1), "1101", has the two least significant bits of "01", the partial bank address "11" of this address is allocated to the port responsible for "01" among the four selected address ports 28. Then, the partial bank address "11" is provided to the address history holding means 30 and the address comparator means 40, both connected to that port. The same holds with the input address (2). As it is "1000", a partial bank address "10" is entered into the port for "00". If it is supposed that no address has been registered in any of the address history holding means 30 by this time, the two accesses will not conflict with each other, and an access permit signal will be supplied from the comparison result output port 60. Further, the two partial bank addresses which are present in the selected address ports 28 at this time are registered in the respectively corresponding address history holding means 30, and held in them thereafter that during a period corresponding to the bank cycle time.

In the second cycle, there is one access and, because the input address (2) is "1001", a partial bank address "10"is entered into the port for "01". As the result of comparison by the address comparator means 40 indicates "non-conflict", an access permit signal is supplied from the comparison result output port 60 as in the preceding cycle. This causes the partial bank address "10" to be registered in the address history holding means 30.

In the third cycle, as the input address (1) is "1000", a partial bank address "10" is entered into the port for "00".

At this time, since the partial bank address registered in the port for "00" in the first cycle is "10", "address conflict" is detected by the address comparator means 40, and an access forbid signal is supplied from the comparison result output 60. As a result, the access of the input address (1) in this cycle is forbidden, and no registration in the address history holding means 30 takes place.

Now will be described another preferred embodiment of the present invention with reference to FIG. 7.

Figure 7:
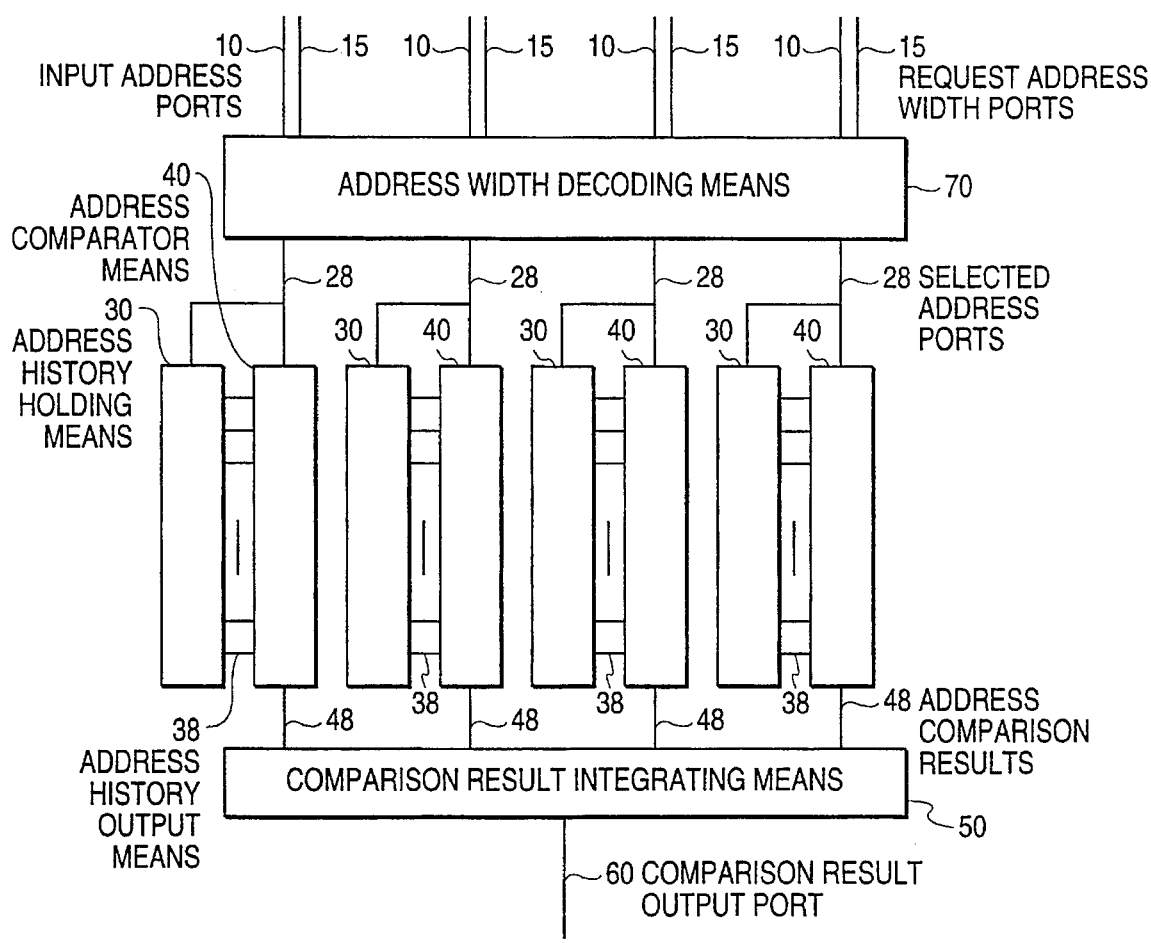
FIG. 7 is a block diagram illustrating the principal part of a memory access control unit which is a second preferred embodiment of the invention.

The embodiment illustrated in FIG. 7 has the same configuration as the above-described embodiment shown in FIG. 2 except that address width decoding means 70 is used in place of the port selector means 20 in FIG. 2 and request address width ports 15 are added. In the configuration of this embodiment, part of each input address is supplied to more than one selected address port 28 in accordance with each of the access request address widths provided by the request address width ports 15. This enables the memory access control unit of this embodiment to predict bank conflict for any access whose width is an integral multiple of the data width of each memory bank.

Figure 8:
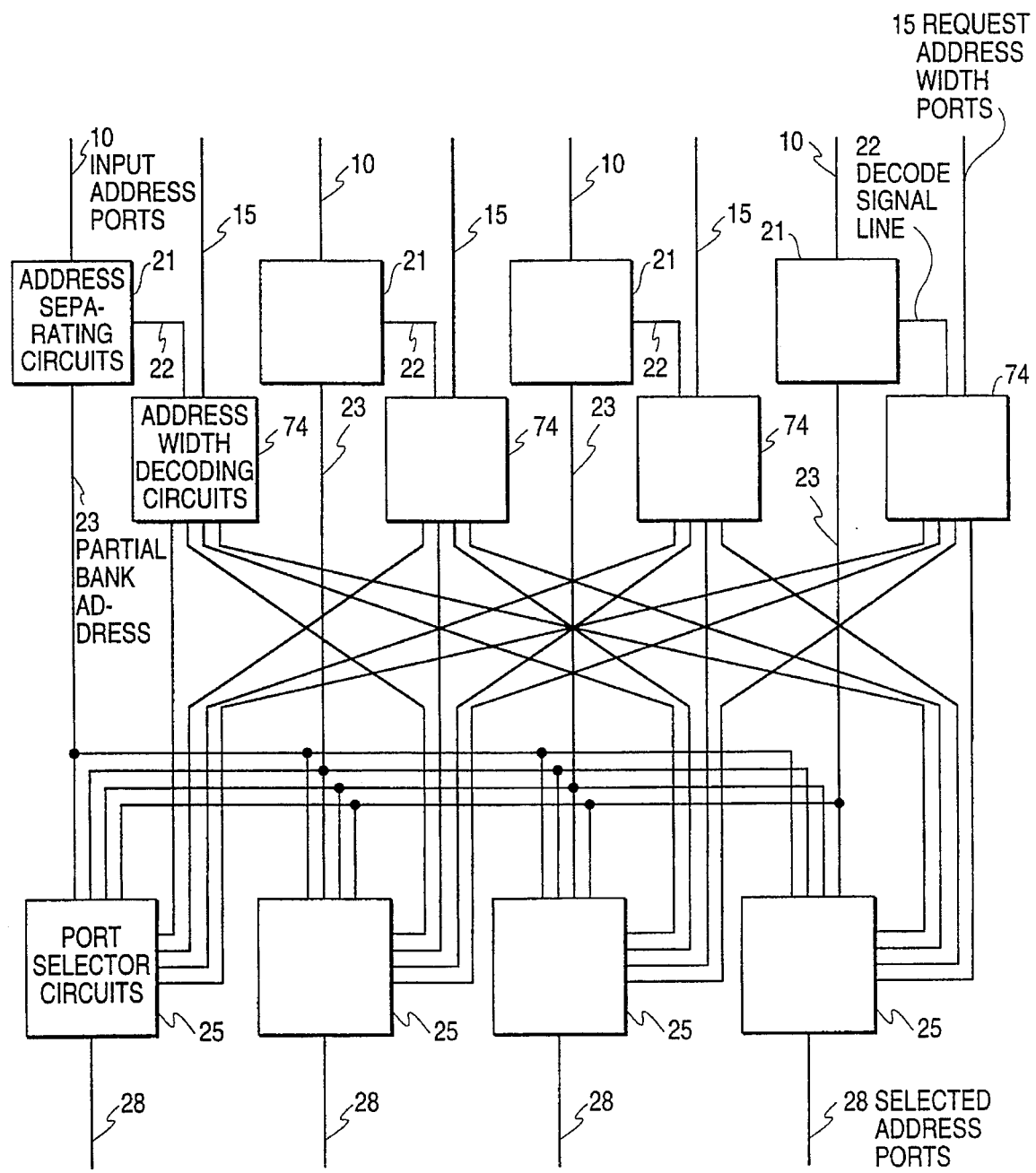
FIG. 8 is a block diagram illustrating a more detailed structure of the address width decoding means.

Referring now to FIG. 8, the address width decoding means 70 has address width decoding circuits 74 in place of the address decoding circuits 24 shown in FIG. 3. Each of these address width decoding circuits 74 generates an address selection signal for the corresponding port selector circuit 25 on the basis of the port start position selected by a decode signal 22 and an address width given by the corresponding request address width port 15. This configuration makes it possible for a plurality of selected address ports 28 to be selected on the basis of a single input address.

Next will be described an example of operation of the embodiment illustrated in FIG. 7 with reference to FIG. 9.

Figure 9:
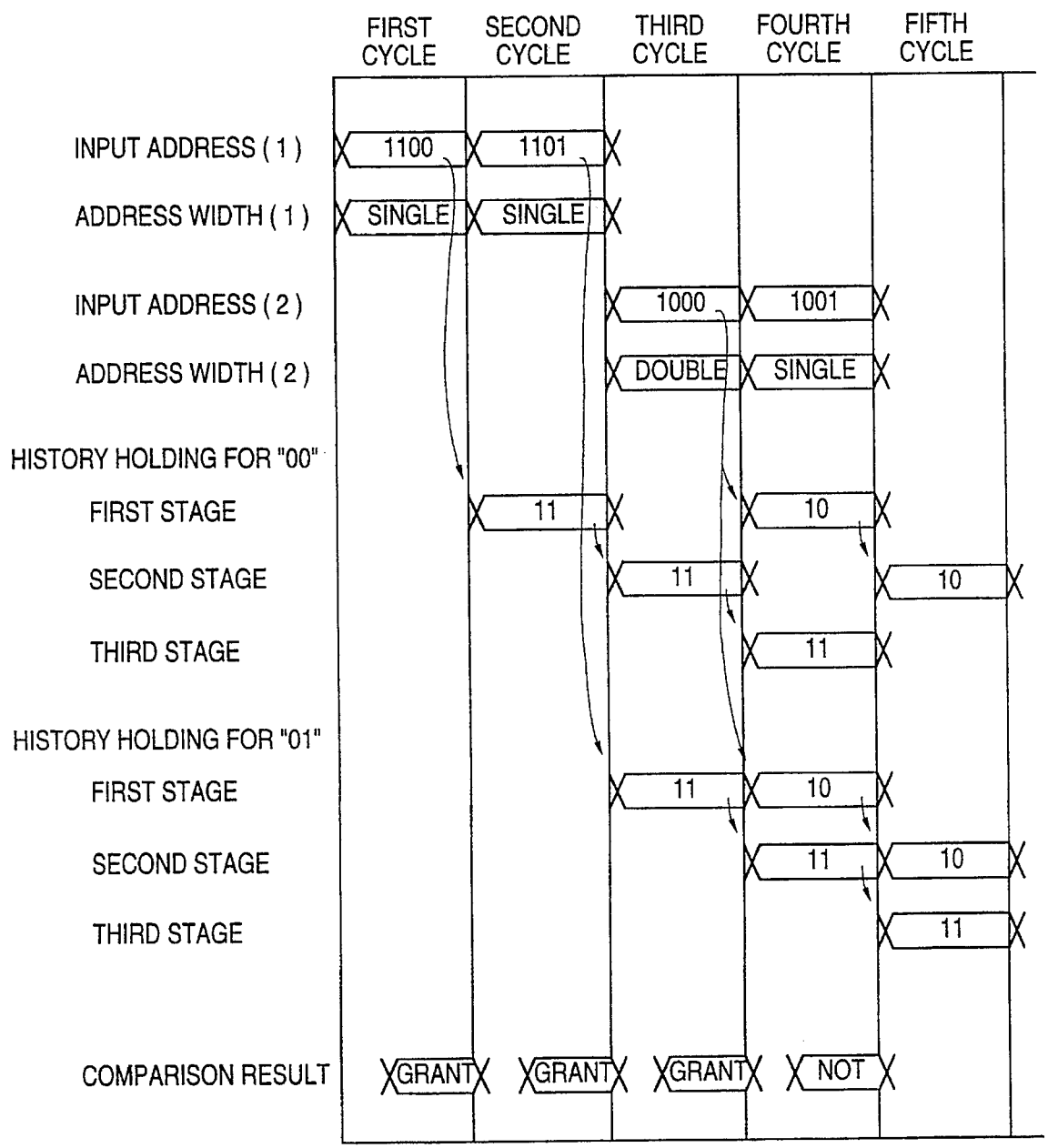
FIG. 9 is a timing chart showing the operational timings of the second preferred embodiment of the invention.

FIG. 9 is a timing chart showing an example of operation of the memory access control unit illustrated in FIG. 7. First the memory access control unit, in accordance with the two least significant bits of an address entered into the input address port 10 and an address width entered into the request address width port 15 in the first cycle, supplies from the address width decoding means 70 the two most significant bits, i.e. a partial bank address, to more than one selected address ports 28. In this example, either address width of two kinds, "Single" and "Double", is selected. Here, if the address width is "Double", consecutive words starting from the input address are selected. Generally, any desired form convenient for the given system can be selected for this configuration. In the instance of FIG. 9, a valid bank address is entered into one input address port 10 in the first cycle. As the input address (1), "1100", has the two least significant bits of "00" and the input address width (1) is "Single", the partial bank address "11" of this address is allocated to the port responsible for "00" among the four selected address ports 28, and the partial bank address "11" is provided to the address history holding means 30 and the address comparator means 40, both connected to that port. If it is supposed that no address has been registered in any of the address history holding means 30 by this time, this access will not conflict with any other, and an access permit signal will be supplied from the comparison result output port 60. Further, the partial bank address "11", which is present in the selected address ports 28 at this time, is registered in the corresponding address history holding means 30, and held in it thereafter that during a period corresponding to the bank cycle time.

In the second cycle, because the input address (2) is "1001" and the input address (1) is "Single", a partial bank address "11" is entered into the port for "01". As the result of comparison by the address comparator means 40 indicates "non-conflict", an access permit signal is supplied from the comparison result output port 60 as in the preceding cycle. This causes the partial bank address "11" to be registered in the address history holding means 30.

In the third cycle, as the input address (2) is "1000" and the input address width (2) is "Double", a partial bank address "10" is entered into both the port for "00" and that for "01". Since the result of comparison by the address comparator means 40 indicates "non-conflict", an access permit signal is supplied from the comparison result output port 60 as in the preceding cycle. This causes the partial bank address "10" for the port for "00" and that for "01" are registered in the respectively corresponding address history holding means 30.

In the fourth cycle, because the input address (2) is "1001" and the input address (2) is "Single", a partial bank address "10" is entered into the port for "01". At this time, as the partial bank address registered in the port for "01" in the third cycle is "10", "address conflict" is detected by the address comparator means 40, and an access forbid signal is supplied from the comparison result output 60. As a result, the access of the input address (1) in this cycle is forbidden, and no registration in the address history holding means 30 takes place.

As is evident from the foregoing description, since the present invention makes it possible for each individual port to compare held address history and input addresses independently of other parts, the number of required address comparators can be restrained to a number proportional to that of input ports. Furthermore, as part of any address can be identified by the port position to which the address is allocated, comparison of that part can be dispensed with. These features make it possible to reduce the bit width of addresses in the address history holding means and in the address comparator means, and thereby to provide an efficient data processing apparatus reduced in hardware cost.

What is claimed is:

1. A data processing apparatus which includes a processor capable of issuing a plurality of memory access requests simultaneously and memory means having a plurality of memory ports, each of said memory ports being connected on a one-to-one basis to a plurality of memory banks, comprising:

port selector means for receiving said plurality of simultaneously issued memory access requests from said processor and for allocating said plurality of simultaneously issued memory access requests to corresponding ones of said memory ports of said memory means based on a lower address part of a memory address of each of said plurality of simultaneously issued memory access requests;

address history holding means for holding information related to a bank of addresses currently being used by said processor from a higher address part of a memory address of a previously issued memory access request for each of said memory ports;

address comparator means for comparing a memory address of said plurality of simultaneously issued memory access requests for a corresponding one of said memory ports received from said port selector means with said bank of addresses held in said address history holding means and for outputting a comparison result as a result thereof; and comparison result integrating means for receiving the comparison result from the address comparator means and determining whether each of said plurality of simultaneously issued memory access requests are to be allowed to access said memory means, wherein said comparison result integrating means prevents said plurality of simultaneously issued memory access requests from accessing said memory means if said previously issued memory access request has accessed a same bank of addresses of a same address port as a memory address of said plurality of said simultaneously issued memory access requests, and said previously issued memory access request has occurred within a predetermined number of cycles prior to said simultaneously issued memory access requests.

2. The data processing apparatus, as claimed in claim 7, wherein said port selector means includes:

a plurality of address decoding circuits for decoding a lower address part of the memory addresses of said plurality of simultaneously issued memory access requests from said processor, for judging whether or not the each of said plurality of simultaneously issued memory access requests is in range of a plurality of ports and for outputting a corresponding decoded signal as a result thereof; and a plurality of port selector circuits, each selecting one from a higher address part of the memory addresses controlled with the corresponding decoded signal output from the address decoding circuits.

* * * * *